United States Patent [19]
Kesinger

[11] Patent Number: 5,927,802
[45] Date of Patent: Jul. 27, 1999

[54] BICYCLE SEAT HAVING FLEXIBLE SUSPENSION PLATFORM FOR SUPPORTING BUTTOCKS OF BICYCLIST

[76] Inventor: Donald A. Kesinger, P.O. Box 396, Morrison, Colo. 80465

[21] Appl. No.: 08/915,448

[22] Filed: Aug. 20, 1997

Related U.S. Application Data

[60] Provisional application No. 60/025,952, Sep. 11, 1996.
[51] Int. Cl.$^6$ ................................ B62J 1/00; B62J 1/10
[52] U.S. Cl. .................... 297/204; 297/207; 297/214; 297/202; 297/195.1
[58] Field of Search ................... 297/195.1, 207, 297/204, 214, 202

[56] References Cited

U.S. PATENT DOCUMENTS

| | | | |
|---|---|---|---|
| 415,253 | 11/1889 | Pattisson | 297/207 |
| 507,413 | 10/1893 | Broadbent | 297/207 |
| 534,326 | 2/1895 | Garford | 297/204 |
| 579,969 | 2/1897 | Hunt | 297/207 |
| 607,565 | 7/1898 | Hunt | 297/207 |
| 623,505 | 4/1899 | Avery | 297/207 |
| 823,916 | 6/1906 | Brooks et al. | 297/204 |
| 1,512,145 | 10/1924 | Starck | 297/207 |
| 2,395,346 | 2/1946 | Schwinn | 297/207 |
| 4,099,769 | 7/1978 | Jacobs | 297/204 |
| 4,367,896 | 1/1983 | Nieddu . | |
| 4,429,915 | 2/1984 | Flager | 297/195.1 |
| 4,999,068 | 3/1991 | Chiarella | 297/214 |
| 5,597,202 | 1/1997 | Andersen | 297/195.1 |
| 5,765,912 | 6/1998 | Bontrager | 297/202 |

FOREIGN PATENT DOCUMENTS

| | | |
|---|---|---|
| 1568 | of 1883 | United Kingdom . |
| 10899 | of 1884 | United Kingdom . |
| 1568 | of 1886 | United Kingdom . |
| 914345 | 1/1963 | United Kingdom . |

*Primary Examiner*—Peter M. Cuomo
*Assistant Examiner*—Anthony D. Barfield
*Attorney, Agent, or Firm*—Flanagan & Flanagan; John R. Flanagan; John K. Flanagan

[57] ABSTRACT

A bicycle seat employs a suspension platform that provides yieldable flexible support of the weight of a bicyclist through contact primarily with the buttocks rather than the crotch of the bicyclist. The suspension platform is formed by a triangular-shaped flexible membrane attached to and extending over and between rigid rear cross and front nose support members mounted respectively to a front end and a pair of rear ends of a U-shaped frame member such that the membrane is held in a taut flat condition under tension so as to provide the flexible support of the bicyclist's buttocks. The membrane is constructed of an inelastic fabric material having a pair of opposite side wing sheets and a longitudinal central band all made of longitudinal strands extending parallel to one another and held together by cross strands interwoven with the longitudinal strands. The longitudinal strands of the side wing sheets extend generally parallel to opposite side edges of the triangular-shaped membrane and in a rear-to-front converging angular relationship to opposite side edges of the longitudinal central band so as to underlie the bicyclist's buttocks to support the weight of the bicyclist through contact of the side wing sheets with the buttocks rather than contact of the longitudinal central band with t e crotch of the bicyclist.

21 Claims, 4 Drawing Sheets

BICYCLE SEAT HAVING FLEXIBLE SUSPENSION PLATFORM FOR SUPPORTING BUTTOCKS OF BICYCLIST

This application claims the benefit of U.S. provisional application No. 60/025,952, filed Sep. 11, 1996.

BACKGROUND OF THE INVENTION

1. Field of the Invention

The present invention generally relates to seats for bicycle and, more particularly, is concerned with a bicycle seat having a flexible suspension platform for supporting the buttocks of a bicyclist.

2. Description of the Prior Art

For many years it had been accepted practice in the bicycle industry to employ a bicycle saddle having a configuration needed to be straddled by a bicyclist. A significant problem arises with respect to a typical conventional bicycle saddle is that it supports most of the weight of the bicyclist unnaturally through the crotch region of the bicyclist rather than naturally through the buttocks region of the bicyclist where the weight should be supported. And this has been a long-standing problem. It was recognized at least as early as the late 1800s in U.S. Pat. No. 415,253 to Pattisson which issued more than a century ago on Nov. 19, 1889. The problem causes such high degree of discomfort that many persons are discouraged from riding bicycles at all after being unable to find a bicycle saddle that solves the problem. Merely providing more padding of the bicycle saddle does not alleviate the discomfort.

Many different bicycle saddle designs have been proposed in the prior art some of which are directed to the above-cited problem while others are addressed to various other perceived drawbacks. Representative of these bicycle saddle designs are the ones disclosed in U.S. Pat. No. 507,413 to Broadbent, U.S. Pat. No. 623,505 to Avery, U.S. Pat. No. 1,512,145 to Starck, U.S. Pat. No. 2,395,346 to Schwinn, U.S. Pat. No. 4,099,769 to Jacobs, U.S. Pat. No. 4,367,896 to Nieddu, British Pat. No. 1,568 (1883) to Brooks, British Pat. Nos. 10,899 (1884) and 1,568 (1885) to Lamplugh and British Pat. No. 914,345 to Nieddu. However, none of these designs are believed to provide a satisfactory solution to the above-mentioned problem.

More recently, a different approach to the aforementioned problem has been proposed in U.S. Pat. No. 5,597,202 to Andersen. The Andersen patent discloses a bicycle seat having a single piece of triangular-shaped fabric formed with an elongated rear base end sleeve and a front apex end pocket and a triangular-shaped frame member provided by a single rod bent to have an upward curved rear base portion extending through the elongated rear base end sleeve of the fabric and a front straight apex portion mounted to an attachment member which is inserted into the front apex end pocket of the fabric and adjustable to drawn the fabric into a taut condition. The upward curved rear base portion of the frame member is elevated above the plane of its front straight apex portion such that the single piece of fabric drawn taut across the frame member is held in the configuration of a hammock seat having a generally planar supporting surface and a wide weight-supporting distal or rear end in contrast to the configuration provided by prior art bicycle saddles.

While the approach proposed by the above-cited Andersen patent may be a step in the right direction, it is still not seen as offering a satisfactory solution to the above-mentioned problem in that its triangular-shaped frame member formed by a single bent rod might tend to introduce a potential new set of problems in terms of the reliability and structural integrity of the frame member. Consequently, a need is still perceived to exist for a bicycle seat design that will overcome the above-mentioned problem with prior art bicycle saddles without introducing a new set of problems.

SUMMARY OF THE INVENTION

The present invention provides a bicycle seat designed to satisfy the aforementioned need. The bicycle seat of the present invention employs a flat flexible suspension platform that provides a yieldable flexible support of the weight of a bicyclist through contact primarily with the pelvic or buttocks region rather than crotch region of the bicyclist. The suspension platform is provided by a triangular-shaped flexible membrane attached to and extending between a rigid rear cross support member and a rigid front nose support member mounted respectively to a front bight portion and respective rear ends of a pair of laterally-spaced longitudinal extending leg portions of a generally U-shaped frame member. In such manner, the frame member via the rigid rear and front support members holds the membrane in a taut flat condition under a predetermined tension along those portions of the membrane that provide flexible support for the buttocks of bicyclist.

In a preferred embodiment of the bicycle seat, the flexible membrane is constructed of an inelastic fabric material having a pair of opposite side wing sheets and a longitudinal central band. Both the side wings and longitudinal central band of the flexible membrane are made of a multiplicity of longitudinal strands extending parallel to one another and held together by another multiplicity of cross strands interwoven with the longitudinal strands. The longitudinal central band of the flexible membrane extends between the front nose support member and a middle portion of the rear cross support member such that the longitudinal strands of the longitudinal central band are fixedly secured at their opposite ends to the front nose support member and the rear cross support member. The opposite side wing sheet of the flexible membrane extend between opposite side edges of the longitudinal central band and opposite end; portions of the rear cross support member extending in opposite directions from the middle portion thereof such that the longitudinal strands of the side wings are fixedly secured at their opposite ends to the longitudinal central band and rear cross support member. These longitudinal strands of the side wing sheets thusly held taut under tension and extending generally parallel to the opposite sides of the triangular-shaped flexible membrane and in a rear-to-front converging angular relationship to the opposite side edges of the longitudinal central band will underlie the buttocks region of the bicyclist so that the weight of the bicyclist be supported by the side wing sheet through contact with the buttocks region rather than by the longitudinal central band through contact with the crotch region of the bicyclist.

Furthermore, in the preferred embodiment of the bicycle seat, the rear ends of the leg portions of the frame member have external threads and adjustment nuts threaded thereon that are adjustable to selectively increase or decrease the distance between the rear cross support member and front nose support member and thereby correspondingly increase or decrease the predetermined tension in the flexible membrane.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Referring to the drawings and particularly to FIGS. 1 to 4, there is illustrated a first embodiment of a bicycle seat of the present invention, generally designated 10, for mounting on any conventional bicycle (not shown). The bicycle seat 10 basically includes a rigid rear cross support member 12, a rigid front nose support member 14, a flexible membrane 16 extending between and attached to the rear cross support member 12 and the front nose support member 14, and a frame member 18 extending between and supporting the rear cross support member 12 and the front nose support member 14 such that a predetermined tension is applied to the flexible membrane 16 holding it in a desired generally flat taut condition extending between the rear cross support member 12 and front nose support member 14 for supporting the buttocks of a bicyclist on the flexible membrane 16 forwardly of and adjacent to the rear cross support member 12.

Figures 1, 2:
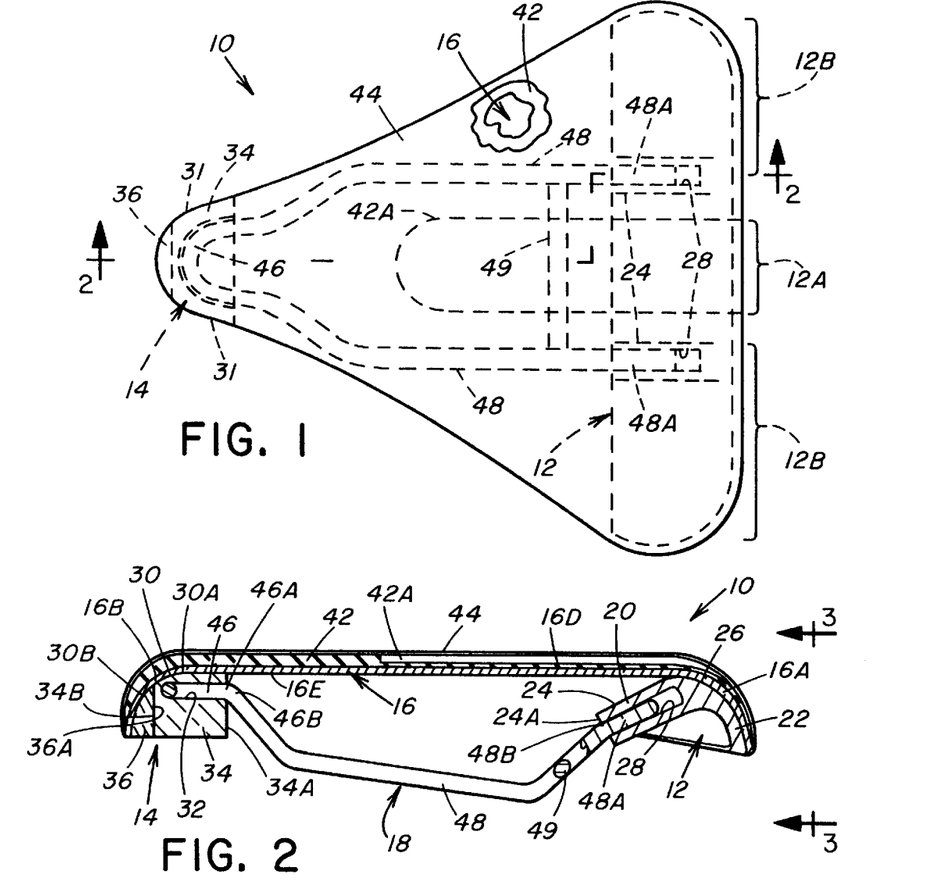
FIG. 1 is a top plan view of a first embodiment of a bicycle seat of the present invention.
FIG. 2 is a longitudinal sectional view of the first embodiment of the bicycle seat taken along line 2—2 of FIG. 1.

Referring more specifically to FIGS. 1 and 2, the rear cross support member 12 has a top portion 20, a rear portion 22 merging with the top portion 20 and a pair of laterally spaced sockets 24 attached on a lower side of the top portion 20 and a front side of the rear portion 22. The top and rear portions 20, 22 together have a curved shape in cross-section so as to define a curved upper side or surface 26 thereon. Each of the sockets 24 protrudes downwardly from the top portion 20 and forwardly from the rear portion 22 and defines a passageway 28 that is open at a forward end 24A of the socket 24.

The front nose support member 14 has front and rear ends, a curved top surface 30 extending from the rear end to and across the front end, and a slot 32 extending into the front nose support member 14 from the rear end thereof. More particularly, the front nose support member 14 is formed by separate rear and front bodies 34, 36 disposed in tandem relationship with one another. The rear body 34 has spaced apart rear and front vertical surfaces 34A, 34B and a portion 30A of the curved top surface 30 extends between the rear and front vertical surfaces 34A, 34B. The slot 32 extends into the rear body 34 and is open at the rear vertical surface 34A thereof and terminates at a location spaced from the front vertical surface 34B thereof. The front body 36 is disposed in front of the rear body 34 and has a curved forward surface 30B providing a continuation of the curved top surface 30 of the front nose support member 14. The front body 36 also has a rear vertical surface 36A lying flush against the front vertical surface 34B of the rear body 34. The front nose support member 14 is relatively small in size compared to that of the rear cross support member 12.

Referring to FIGS. 1, 2, 4, 7 and 8, the flexible membrane 16 has a generally triangular configuration providing a rear base portion 16A and a front apex portion 16B. The flexible membrane 16 at the rear base portion 16A thereof is fixedly attached on and overlies the curved upper surface 26 of the rear cross support member 12. The flexible membrane 16 at the front apex portion 16B thereof is fixedly attached at least on the curved top surface 30 of the front nose support member 14 and preferably also on the opposite side surfaces 31 thereof. The respective rear and front portions 16A and 16B of the flexible membrane 16 are attached to the rear cross support member 12 and front nose support member 14 by employing any well-known conventional attachment technique, such as by the use of adhesives, staples, rivets and ultrasonic welding to name a few. It will be observed that the curved upper surface 26 of the rear cross support member 12 provides a relatively large surface area on which to attach the rear base portion 16A of the flexible membrane 16.

The flexible membrane 16 can be made of any suitable inelastic material, such as a suitable conventional fabric or plastic material. However, it is preferred that the flexible membrane 16 be constructed of a substantially inelastic high strength fabric, such as one known by the trademark Kelvar and others made of carbon fibers and fiberglass.

Figures 4, 5:
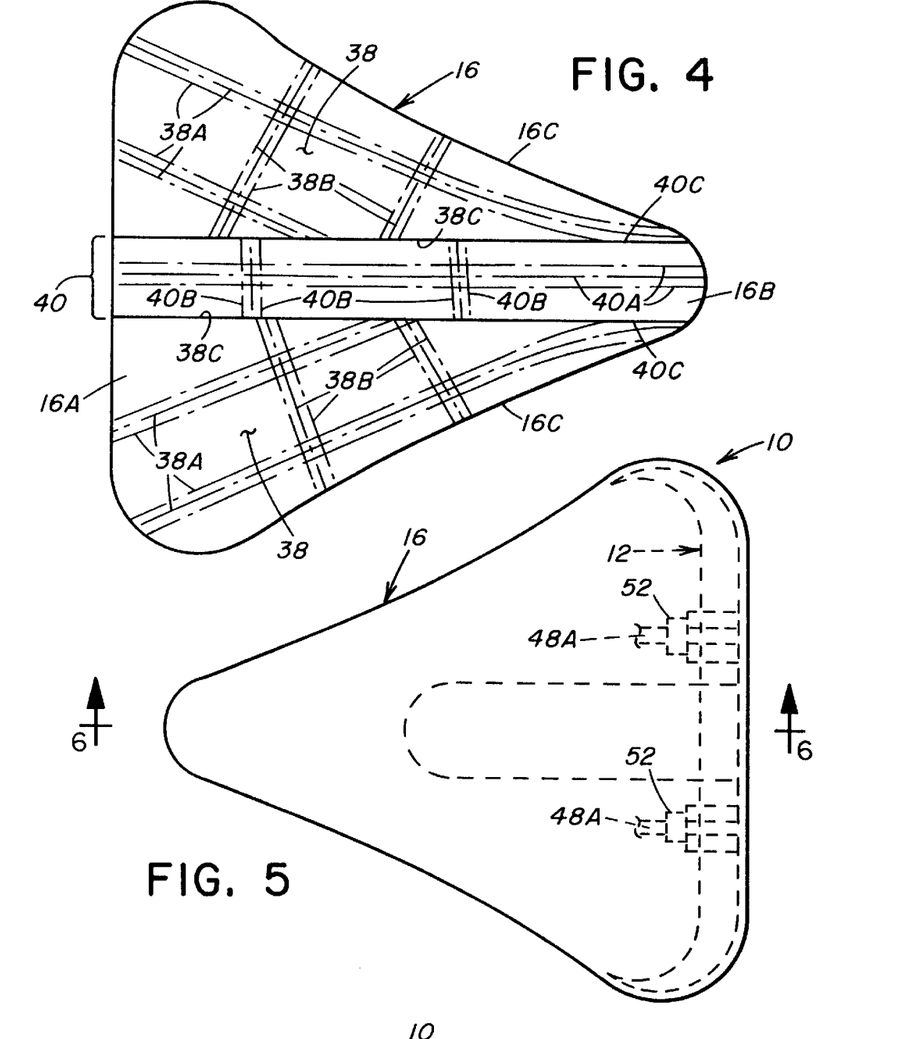
FIG. 4 is a top plan view of a flexible membrane of the bicycle seat showing a preferred pattern of woven strands of a fabric forming the flexible membrane.
FIG. 5 is a top plan view of a second embodiment of the bicycle seat of the present invention.
Figure 7:
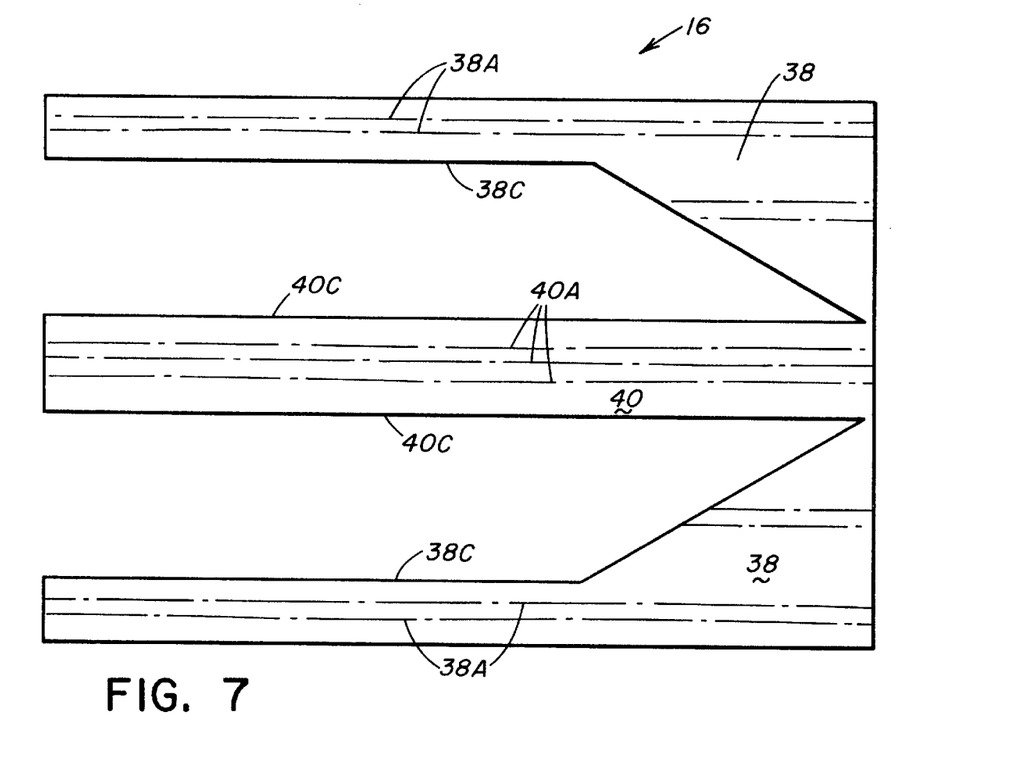
FIG. 7 is a diagrammatic plan layout view of a starting pattern of the fabric for forming the flexible membrane of the bicycle seat of FIGS. 1 and 5.
Figure 8:
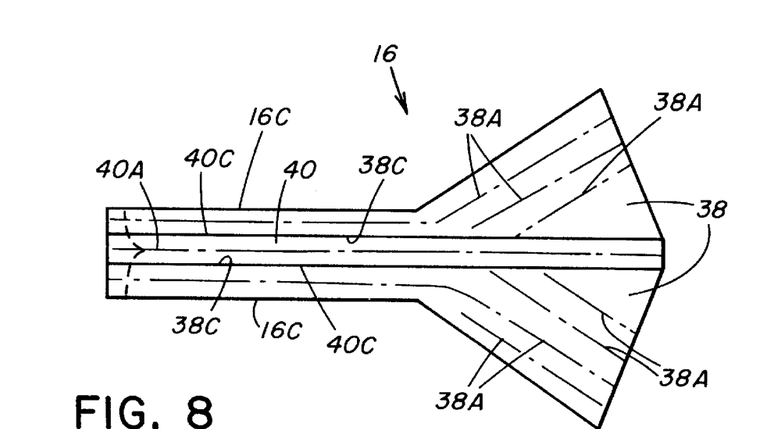
FIG. 8 is a diagrammatic plan layout view of the finished pattern of the fabric forming the flexible membrane of the bicycle seat of FIGS. 1 and 5.
Figure 9:
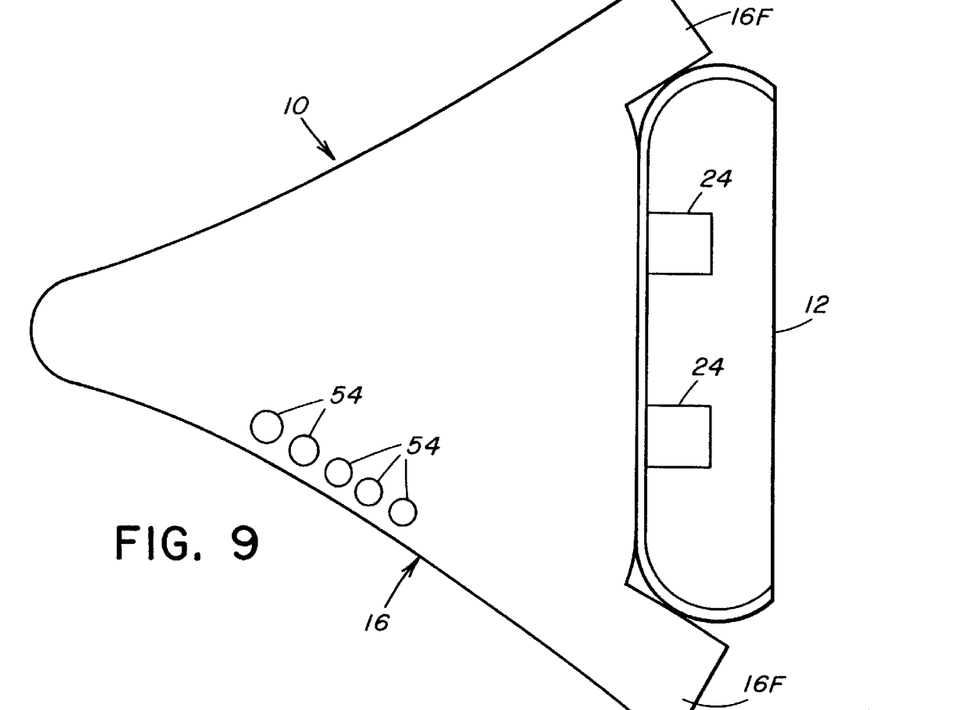
FIG. 9 is a top plan view of a third embodiment of bicycle seat of the present invention showing the flexible membrane, rear cross support member and front nose support member of the bicycle seat molded as a unit.
Figure 10:
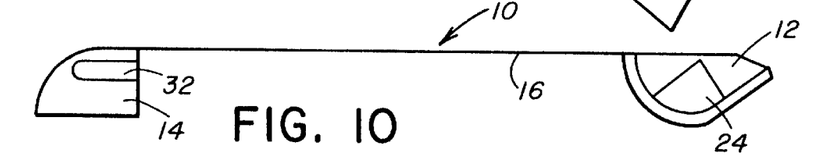
FIG. 10 is a longitudinal sectional view of the third embodiment of the bicycle seat taken along line 10—10 of FIG. 9.
Figure 11:
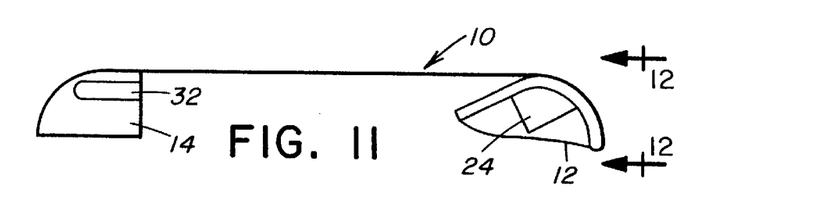
FIG. 11 is a longitudinal sectional view of the third embodiment of the bicycle seat similar to that of FIG. 10 but showing the bicycle seat after the rear cross support member has been rotated from an initial rearwardly extending position shown in FIG. 10 to a final position wherein the rear cross support member underlies a rear edge portion of the flexible membrane.
Figure 12:
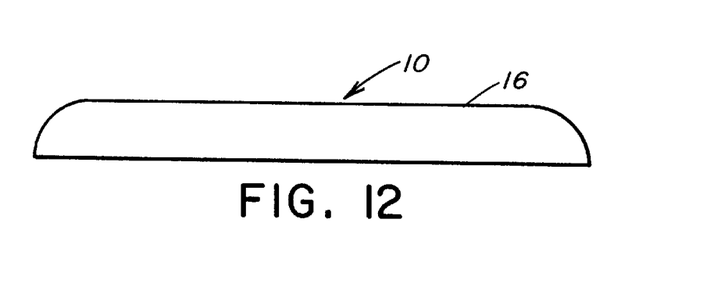
FIG. 12 is a rear elevational view of the bicycle seat seen along line 12—12 of FIG. 11.

Referring more specifically to FIGS. 4, 7 and 8, the flexible membrane 16 includes a pair of opposite side wing sheets 38 and a longitudinal central strip or band 40. Where the flexible membrane 16 is a woven fabric, each of the opposite side wings 38 and the longitudinal central band 40 have a multiplicity of longitudinal strands 38A, 40A extending parallel to one another and held together by another multiplicity of cross strands 38B, 40B which are closely interwoven with the longitudinal strands 38A, 40A and extend parallel to one another and transversely to the longitudinal strands 38A, 40A. The longitudinal strands 38A, 40A and the cross strands 38B, 40B are represented by dot/dash lines in FIGS. 4, 7 and 8. The side wing sheets 38 of the flexible membrane 16 are provided with their longitudinal strands 38A extending in a generally fore-and-aft direction which is the same as the direction that stress is transmitted through the flexible membrane 16 when supporting the buttocks region of the bicyclist thereon. Thus, the cross strands 38B of the side wing sheets 38 which merely hold the longitudinal strands 38A in the side-by-side parallel relationship extend generally in a direction which is transverse to the direction of transmission of stress.

More particularly, the longitudinal central band 40 of the flexible membrane 16 extends between the front nose support member 14 and a middle portion 12A of the rear cross support member 12 such that the longitudinal strands 40A of the longitudinal central band 40 are fixedly secured at their opposite ends to the rear cross support member 12 and the front nose support member 14. The side wing sheets 38 of the flexible membrane 16 extend between the opposite side edges 40C of the longitudinal central band 40 and the opposite end portions 12B of the rear cross support member 12 which extend in opposite directions from the middle portion 12A thereof such that the longitudinal strands 38A of the side wing sheets 38 are fixedly secured at opposite ends to the longitudinal central band 40 and the rear cross support member 12. These longitudinal strands 38A of the side wings 38 which are held taut under tension and extend generally parallel to the opposite sides 16C of the triangular-shaped flexible membrane 16 and in a rear-to-front converging angular relationship to the opposite side edges 40C of the longitudinal central band 40, underlie and support the buttocks region of the bicyclist so that the weight of the bicyclist is supported by the side wing sheets 38 through contact with the buttocks region rather than by the longitudinal central band 40 through contact with the crotch region of the bicyclist.

FIGS. 7 and 8 are diagrammatic layouts of a piece of the fabric employed to form the flexible membrane 16 of the bicycle seat 10 of the present invention. FIG. 7 depicts the starting pattern of the fabric for forming the flexible membrane 16. A rectangular piece of the fabric is cut into the generally E-shaped configuration shown in FIG. 7. Then, the opposing inner side edges 38C, 40C of the side wing sheets 38 and longitudinal central band 40 are attached together using any suitable known technique, such as by sewing the overlapped edges together. FIG. 8 depicts the finished pattern of the fabric forming the flexible membrane 16 after the opposing inner edges have been overlapped and sewn together. The opposite outer side edges 16C of the flexible membrane 16 are folded under and stitched to provide a double thickness of the flexible membrane 16 therealong which adds strength and prevents fraying along the opposite outer side edges 16C. The front apex portion 16B can be cut along the dashed line and then sewed together along the cut edges so as to provide a curvature which fits the curved top and front surface 30 of the front nose support member 16 of the bicycle seat 10.

Referring again to FIGS. 1 to 3, the bicycle seat 10 of the present invention preferably further includes a layer of padding 42 applied to an upper surface 16D of the flexible membrane 16. The layer of padding 42 is preferably thicker in side regions thereof overlying the side wings sheets 38 of the flexible membrane 16 that, in turn, underlie the buttocks region of the bicyclist than in a central region thereof overlying at least a portion (represented by dashed line 42A in FIGS. 1 and 5) of the longitudinal central band 40 of the flexible membrane 16 that, in turn, underlies the crotch region of the bicyclist. The reduced thickness of the layer of padding 42 defines an upper depression at 42A in the layer of padding 42 in the central portion thereof, as seen in FIG. 2. The bicycle seat 10 of the present invention also includes an outer covering sheet 44 of any suitable flexible stretchable material, such as nylon, fitted over the layer of padding 42 and the flexible membrane 16 and secured by any suitable known means, such as by using adhesives, to a lower surface 16E of the flexible membrane 16 and also to lower sides of the rear cross support member 12 and front nose support member 14.

Figure 3:
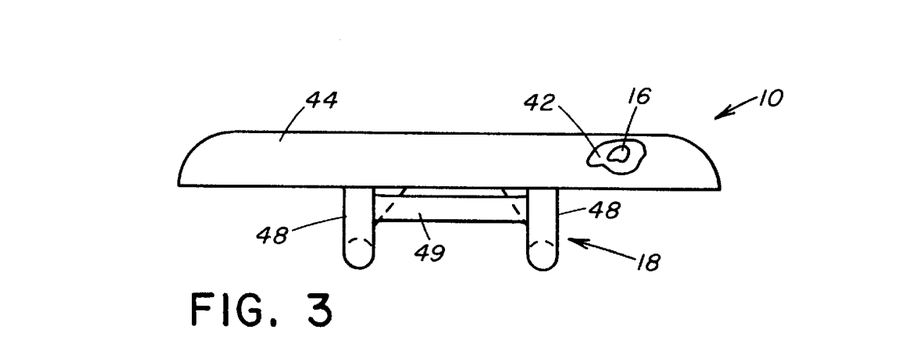
FIG. 3 is a rear elevational view of the bicycle seat seen along line 3—3 of FIG. 2.

Referring still to FIGS. 1 to 3, the frame member 18 of the bicycle seat 10 has a generally U-shaped configuration and a forward bight portion 46 and a pair of leg portions 48. The forward bight portion 46 is U-shaped and of a size adapted to be inserted into the slot 32 in the front nose support member 14. The leg portions 48 merge from opposite ends 46A of the bight portion 46 and extend rearwardly therefrom, terminating at rear ends 48A that are of sizes adapted to be inserted into the respective passageways 28 of the sockets 24 in the rear cross support member 12.

Figure 6:
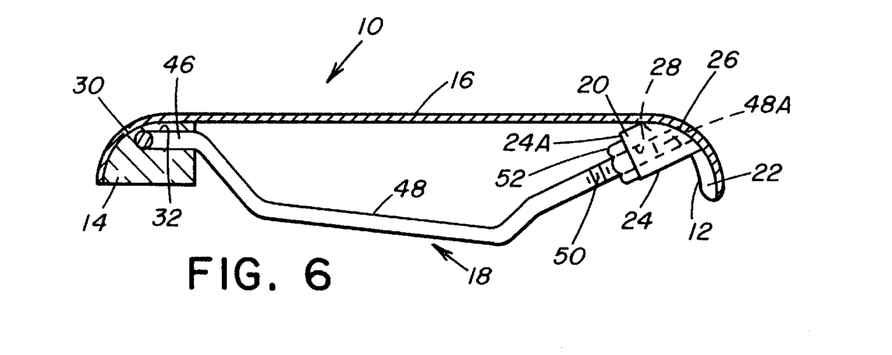
FIG. 6 is a longitudinal sectional view of the second embodiment of the bicycle seat taken along line 6—6 of FIG. 5.

The frame member 18 is preferably made of a substantially rigid but forceably springy rod-like material, such as steel or comparable metal, that will permit a temporary flexing and deforming of the frame member 18 sufficient to allow insertion and withdrawal of the opposite rear ends 48A of the leg portions 48 into and from the sockets 24 in the rear cross support member 12 and the front bight portion 46 into and from the slot 32 in the front nose support member 14. Also, the leg portions 48 preferably are shallow U-shaped, as seen in FIGS. 2 and 6, which facilitates the temporary deforming of the frame member 18 by using any suitable technique that would be well-known to those of ordinary skill in the art. The length of the flexible membrane 16 relative to the distance between the opposite ends of the frame member 18 is chosen so that when the rear cross support member 12 and front nose support member 14 (with the flexible membrane 16 attached thereto and extending therebetween) are mounted on the forward bight portion 46 and rear ends 48A of the leg portions 48 of the frame member 18, the desired predetermined tension is induced in or applied to the flexible membrane 16 such that the flexible membrane 16 is held in the substantially flat taut condition between the rear cross support member 12 and the front nose support member 14 for supporting the buttocks of the bicyclist on the side wings 38 of the flexible membrane 16 substantially immediately forwardly of and adjacent to the rear cross support member 12 of the bicycle seat 10. For added strength and durability, the frame member 18 also preferably includes a cross bar 49 extending between and fixedly attached to the leg portions 48 of the frame member 18 forwardly of the rear ends 48A of the leg portions 48.

The leg portions 48 of the frame member 18 are permanently bent at locations 48B near their rear ends 48A which act as stops limiting the insertion of the rear ends 48A into the passageways 28 of the sockets 24. Also, the bight portion 46 is permanently bent at locations 46A which act as stops limiting the insertion of the bight portion 46 into the slot 32 of the front nose support member 14.

With the configuration of the frame member 18 shown in FIGS. 1 and 2, the predetermined tension provided in the flexible membrane 16 cannot be varied after the components of the bicycle seat 10 are assembled. It is preferable to be able to vary the tension somewhat after the bicycle seat 10 is assembled. Referring to FIGS. 5 and 6, the tension provided in the flexible membrane 16 can be adjusted by providing the rear ends 48A of the leg portions 48 of the frame member 18 with external threads 50 and threading suitable adjustment nuts 52 thereon. The nuts 52 are threadably adjustable along the rear ends 48A of the leg portions 48 of the frame member 18 and abut the forward ends 24A of the sockets 24 so as to selectively increase or decrease the distance between the rear cross support member 12 and the front nose support member 14 which, in turn, correspondingly increases or decreases the predetermined tension in the flexible membrane 16.

The above-described components of the bicycle seat 10 can be assembled as follows. First, the front apex portion 16B of the flexible membrane 16 is attached to the curved surface portion 30A of the rear body 34 of the front nose support member 14 and then the rear base portion 16A of the flexible membrane 16 is attached to the curved upper surface 26 on the rear cross support member 12. The rear body 34 is straight across its front surface 34B so that uniform tension will be applied through out the flexible membrane 16 once mounted to the frame member 18. The front body 36 of the front nose support member 14 which forms a nosecap is applied to cover the front of the rear body 34 after attachment of the front apex portion 16B of the flexible membrane 16 thereto so as to present a more pleasing silhouette on the assembled front nose support member 14. Once the flexible membrane 16 is assembled to the rear cross support member 12 and front nose support member 14, the frame member 18 is then temporarily deformed into a deeper U-shape. The rear cross support member 12 and front nose support member 14 are then respectively inserted and mounted on the rear ends 48A of the leg portions 48 of the frame member 18 and the front bight portion 46 of the frame member 18, after which the deformation of the frame member 18 is removed allowing it to spring back to its original shape and impose the desired tension on the flexible membrane 16. The nuts 52 can be turned to adjust the tension as desired. When the bicyclist sits on the flexible membrane 16, the only pressure imposed will be that on the buttocks region felt by the bicyclist as a springy-type comfortable contact with the side wings 38 of the flexible membrane 16. The presence of the layer of padding 42 will further increase the comfort of the contact.

Referring to FIGS. 9 to 12, in a third embodiment of the bicycle seat 10, the rear cross support member 12, front nose support member 14 and flexible membrane 16 are molded as a unit from a suitable material, such as a plastic. During molding, the rear cross support member 12 is disposed in a rearwardly extending position shown in FIGS. 9 and 10 wherein the rear cross support member 12 is located rearwardly of the rear base portion 16A of the flexible membrane 16. Before application to the frame member 18, side tensioning tabs 16F molded at the opposite rear corners of the flexible membrane 16 are first attached to the rear cross support member 12. Then, the rear cross support member 12 is rotated from the rearwardly extending position shown in FIGS. 9 and 10 to the forwardly extending position shown in FIG. 11, wherein the rear cross support member 12 underlies the rear base portion 16A of the flexible membrane 16. Ventilation holes 54 may be provided in the flexible membrane 16.

In summary, unlike the prior art bicycle saddles on the commercial market, the objective of the disclosed bicycle seat 10 of the present invention is to provide maximum comfort for bicycle riders. The bicycle saddles presently on the market apply pressure primarily to the crotch region of the human anatomy which is not the site for receiving pressure typically associated with the act of seating. If a person sits on a hard bench, pressure is typically applied to the pelvic bone through the buttocks region of the human anatomy and not through the crotch region. If a person sits on an existing bicycle saddle, pressure is typically applied to the pelvic bone through the crotch region of the human anatomy and to regions of the human anatomy in front of the pelvic bone, neither of which are designed to receive such high pressure. The result is pain and discomfort. The bicycle seat 10 of the present invention is designed to prevent application of high pressure in these latter regions of the human anatomy. The bicyclist is suspended via his or her buttocks region on the flexible membrane 16 of the bicycle seat 10 where the human anatomy is designed to receive such high pressures.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A bicycle seat, comprising:

(a) a rear cross support member defining a pair of laterally spaced passageways, each of said passageways being open at a forward end and aligned generally forwardly from said rear cross support member;

(b) a front nose support member having front and rear ends and defining an unthreaded arcuate slot extending into said front nose support member from said rear end thereof, said unthreaded arcuate slot being open at said rear end of said front nose support member and terminating at a location therein spaced from said front end thereof;

(c) an inelastic flexible membrane having an upper surface and a pair of opposite side wing sheets provided together in a generally triangular configuration and extending in opposite angular relationships to and in opposite directions away from a longitudinal center of seat, the inelastic flexible membrane defining a rear base portion and a front apex portion, said inelastic flexible membrane at said rear base portion extending over and anchored about said rear cross support structure and at said front apex portion extending over and anchored about said front nose support member;

(d) a layer of padding applied to and attached on said upper surface of said inelastic flexible membrane and extending between and anchored about said rear cross support structure and said front nose support member; and (e) a frame member extending between and mounting said rear cross support member and said front nose support member such that a predetermined tension is applied to said inelastic flexible membrane holding said inelastic flexible membrane in a taut condition extending between said rear cross support member and said front nose support member for supporting the buttocks of a bicyclist on said layer of padding applied on said upper surface of said inelastic flexible membrane forwardly of and adjacent to said rear cross support member, said frame member having a forward U-shaped bight portion slidably inserted into said slot in said front nose support member and a pair of leg portions merging from said forward U-shaped bight portion and extending rearwardly and terminating at rear ends inserted into said respective passageways in said rear cross support member.

2. The bicycle seat of claim 1 wherein said layer of padding is thicker on portions of said flexible membrane adapted to underlie the buttocks region of the bicyclist than on a central portion of said flexible membrane adapted to underlie the crotch region of the bicyclist so as to define an upper depression in said central portion of said layer of padding.

3. The bicycle seat of claim 1 wherein said side wing sheets of said inelastic flexible membrane are made of a multiplicity of longitudinal strands extending parallel to one another and held together by another multiplicity of cross strands closely interwoven with said longitudinal strands.

4. The bicycle seat of claim 3 wherein said inelastic flexible membrane further has a longitudinal central band also made of said closely interwoven longitudinal and cross strands and extending between said front nose support member and a middle portion of said rear cross support member such that said longitudinal strands of said longitudinal central band are fixedly secured at opposite ends to said front nose support member and said rear cross support member.

5. The bicycle seat of claim 1 wherein said rear cross support member, front nose support member and flexible membrane are molded as a unit, said rear cross support member being rotatable from a rearward extending position located rearwardly of said flexible membrane to a forwardly extending position underlying a rear edge portion of said flexible membrane.

6. The bicycle seat of claim 1 wherein rearward portions of said leg portions of said frame member have external threads and adjustment nuts threaded thereon that are adjustable to selectively increase or decrease the distance between said rear cross support member and front nose support member and thereby correspondingly increase or decrease said predetermined tension in said inelastic flexible membrane.

7. A bicycle seat, comprising:
(a) a rear cross support member having an upper side and a pair of laterally spaced sockets, each of said sockets protruding downwardly and forwardly from said upper side and defining a passageway open at a forward end thereof;
(b) a front nose support member having front and rear ends, a top surface extending between said front and rear ends, and a slot extending into said front nose support member from said rear end thereof, said slot being open at said rear end of said front nose support member and terminating at a location therein spaced from said front end thereof, said front nose support member being formed by separate rear and front bodies, said rear body having spaced apart front and rear vertical surfaces and having a portion of said top surface extending between said front and rear vertical surfaces;
(c) a flexible membrane having a generally triangular configuration providing a rear base portion and a front apex portion, said flexible membrane at said rear base portion being fixedly attached on said upper side of said rear cross support structure, said flexible membrane at said front apex portion being fixedly attached on said top surface of said front nose support member; and
(d) a frame member extending between and mounting said rear cross support member and said front nose support member such that a predetermined tension is applied to said flexible membrane holding said flexible membrane in a taut condition extending between said rear cross support member and said front nose support member for supporting the buttocks of a bicyclist on said flexible membrane forwardly of and adjacent to said rear cross support member, said frame member being generally U-shaped and having a forward bight portion inserted into said slot in said front nose support member and a pair of leg portions merging from said bight portion and extending rearwardly and terminating at rear ends inserted into said respective passageways of said laterally spaced sockets in said rear cross support member.

8. The bicycle seat of claim 7 wherein said rear cross support member has top and rear portions merging with one another and being of a curved shape in cross-section, said sockets being attached on a lower side of said top portion and a front side of said rear portion, each of said sockets protruding downwardly from said top portion and forwardly from said rear portion.

9. The bicycle seat of claim 7 wherein said slot extends into said rear body and is open at said rear vertical surface of said rear body and terminates at said location spaced from said front vertical surface of said rear body, said front body being disposed in front of said rear body and having a curved forward surface providing a continuation of said top surface of said rear body, said front body also having a rear vertical surface lying flush against said front vertical surface of said rear body.

10. The bicycle seat of claim 7 wherein said frame member also includes a cross bar portion extending between and attached to said leg portions forwardly of said rear ends thereof.

11. The bicycle seat of claim 7 further comprising:
a layer of padding applied to an upper surface of said flexible membrane.

12. The bicycle seat of claim 7 further comprising:
a covering sheet of flexible stretchable material fitted over said layer of padding and said flexible membrane and secured to a lower surface of said flexible membrane.

13. The seat of claim 7 wherein said frame member is made of a substantially rigid but forceably springy material that permits temporary flexing and deforming of said frame member to allow insertion and withdrawal of said opposite rear ends and said front bight into and from said sockets and said slot in said rear cross support member and said front nose support member.

14. The bicycle seat of claim 7 wherein said flexible membrane is constructed of a substantially inelastic fabric material having a pair of opposite side wings and an elongated longitudinal central band.

15. A bicycle seat, comprising:
a rear cross support member having an upper side and a pair of laterally spaced sockets, each of said sockets protruding downwardly and forwardly from said upper side and defining a passageway open at a forward end thereof;
(b) a front nose support member having front and rear ends, a top surface extending between said front and rear ends, and a slot extending into said front nose support member from said rear end thereof, said slot being open at said rear end of said front nose support member and terminating at a location therein spaced from said front end thereof;
(c) a flexible membrane having a generally triangular configuration providing a rear base portion and a front apex portion, said flexible membrane at said rear base portion being fixedly attached on said upper side of said rear cross support structure, said flexible membrane at said front apex portion being fixedly attached on said top surface of said front nose support member; and
(d) a frame member extending between and mounting said rear cross support member and said front nose support member such that a predetermined tension is applied to said flexible membrane holding said flexible membrane in a taut condition extending between said rear cross support member and said front nose support member for supporting the buttocks of a bicyclist on said flexible membrane forwardly of and adjacent to said rear cross support member, said frame member being generally U-shaped and having a forward bight portion inserted into said slot in said front nose support member and a pair of lea portions merging from said bight portion and extending rearwardly and terminating at rear ends inserted into said respective passageways of said laterally spaced sockets in said rear cross support member;

(e) said flexible membrane being constructed of a substantially inelastic fabric material having a pair of opposite side wing sheets and an elongated longitudinal central band, all of said side wing sheets and said longitudinal central band of said flexible membrane being made of a multiplicity of longitudinal strands extending parallel to one another and held together by another multiplicity of cross strands closely interwoven with said longitudinal strands, said longitudinal central band of said flexible membrane extending between said front nose support member and a middle portion of said rear cross support member such that said longitudinal strands of said longitudinal central band are fixedly secured at opposite ends to said front nose support member and said rear cross support member;

(f) said opposite side wing sheets of said flexible membrane extending between opposite side edges of said longitudinal central band and opposite end portions of said rear cross support member extending in opposite directions from said middle portion thereof such that said longitudinal strands of said side wing sheets are fixedly secured at opposite ends to said central band and said rear cross support member whereby said longitudinal strands of said side wing sheets are thusly held in said taut condition under tension extending generally parallel to opposite sides of said flexible membrane and in a rear-to-front converging angular relationship to said opposite side edges of said longitudinal central band so as to underlie the buttocks region of the bicyclist so that the weight of the bicyclist be supported by said side wing sheets of said flexible membrane through contact with the buttocks region rather than with the crotch region of the bicyclist.

16. The bicycle seat of claim 15 further comprising:
a layer of padding applied to an upper surface of said flexible membrane, said layer of padding being thicker in regions thereof overlying said side wings of said flexible membrane than in a corresponding region thereof overlying at least a portion of said longitudinal central band of said flexible membrane.

17. A bicycle seat, comprising:
(a) a rear cross support member having an upper side and a pair of laterally spaced sockets, each of said sockets protruding downwardly and forwardly from said upper side and defining a passageway open at a forward end thereof;
(b) a front nose support member having front and rear ends, a top surface extending between said front and rear ends, and a slot extending into said front nose support member from said rear end thereof, said slot being open at said rear end of said front nose support member and terminating at a location therein spaced from said front end thereof;

(c) a flexible membrane of substantially inelastic material having a generally triangular configuration providing a rear base portion and a front apex portion, said flexible membrane at said rear base portion being fixedly attached on said upper side of said rear cross support structure, said flexible membrane at said front apex portion being fixedly attached on said top surface of said front nose support member; and (d) a frame member extending between and mounting said rear cross support member and said front nose support member such that a predetermined tension is applied to said flexible membrane holding said flexible membrane in a taut condition extending between said rear cross support member and said front nose support member for supporting the buttocks of a bicyclist on said flexible membrane forwardly of and adjacent to said rear cross support member;

(e) said flexible membrane being constructed of a substantially inelastic fabric material having a pair of opposite side wing sheets and a longitudinal central band, all of said side wing sheets and said longitudinal central band of said flexible membrane being made of a multiplicity of longitudinal strands extending parallel to one another and held together by another multiplicity of cross strands interwoven with said longitudinal strands, said longitudinal central band of said flexible membrane extending between said front nose support member and a middle portion of said rear cross support member such that said longitudinal strands of said longitudinal central band are fixedly secured at opposite ends to said front nose support member and said rear cross support member, said opposite side wing sheets of said flexible membrane extending between opposite side edges of said longitudinal central band and opposite end portions of said rear cross support member extending in opposite directions from said middle portion thereof such that said longitudinal strands of said side wing sheets are fixedly secured at opposite ends to said central band and said rear cross support member whereby said longitudinal strands of said side wing sheets are thusly held in said taut condition under tension extending generally parallel to opposite sides of said flexible membrane and in a rear-to-front converging angular relationship to said opposite side edges of said longitudinal central band so as to underlie the buttocks region of the bicyclist such that the weight of the bicyclist is supported by said side wing sheets of said flexible membrane through contact with the buttocks region rather than by said longitudinal central band through contact with the crotch region of the bicyclist.

18. The bicycle seat of claim 17 further comprising:
a layer of padding applied to an upper surface of said flexible membrane.

19. The bicycle seat of claim 18 wherein said layer of padding is thicker in regions thereof overlying said side wings of said flexible membrane adapted to underlie the buttocks region of the bicyclist than in a corresponding region thereof overlying at least a portion of said longitudinal central band of said flexible membrane adapted to underlie the crotch region of the bicyclist.

20. The bicycle seat of claim 18 further comprising:
a covering sheet of flexible stretchable material fitted over said layer of padding and said flexible membrane and secured to a lower surface of said flexible membrane.

21. A bicycle seat, comprising:
(a) a rear cross support member having an upper side and a pair of laterally spaced sockets, each of said sockets protruding downwardly and forwardly from said upper side and defining a passageway open at a forward end thereof;

(b) a front nose support member having front and rear ends, a top surface extending between said front and rear ends, and a slot extending into said front nose support member from said rear end thereof, said slot being open at said rear end of said front nose support member and terminating at a location therein spaced from said front end thereof;

(c) a flexible membrane of substantially inelastic fabric material having an upper surface and a pair of opposite side wing sheets and an elongated longitudinal central band provided in a generally triangular configuration defining a rear base portion and a front apex portion, said inelastic flexible membrane at said rear base portion being fixedly attached on said upper side of said rear cross support structure, said inelastic flexible membrane at said front apex portion being fixedly attached on said top surface of said front nose support member;

(d) a layer of padding applied and attached on said upper surface of said inelastic flexible membrane and extending between said rear cross support structure and said front nose support member; and (e) a frame member extending between and mounting said rear cross support member and said front nose support member such that a predetermined tension is applied to said inelastic flexible membrane holding said inelastic flexible membrane in a taut condition extending between said rear cross support member and said front nose support member for supporting the buttocks of a bicyclist on said layer of padding applied on said upper surface of said inelastic flexible membrane forwardly of and adjacent to said rear cross support member, said frame member being generally U-shaped and having a forward bight portion inserted into said slot in said front nose support member and a pair of leg portions merging from said bight portion and extending rearwardly and terminating at rear ends partially inserted into said respective passageways of said laterally spaced sockets in said rear cross support member, said rear ends of said leg portions of said frame member having external threads and adjustment nuts threaded thereon that are adjustable to selectively increase or decrease the distance between said rear cross support member and front nose support member and thereby correspondingly increase or decrease said predetermined tension in said inelastic flexible membrane.

* * * * *